United States Patent [19]

Horiuchi et al.

[11] Patent Number: 5,170,253
[45] Date of Patent: Dec. 8, 1992

[54] SUBTITLING APPARATUS WITH MEMORY CONTROL CODES INTERSPERSED WITH GRAPHIC DATA

[75] Inventors: Tadasu Horiuchi; Iwao Aizawa, both of Yokohama, Japan

[73] Assignee: Hitachi, Ltd., Tokyo, Japan

[21] Appl. No.: 637,786

[22] Filed: Jan. 7, 1991

[30] Foreign Application Priority Data

Jan. 10, 1990 [JP] Japan ............................ 2-001511

[51] Int. Cl.$^5$ ............................................. H04N 5/278
[52] U.S. Cl. .................................... 358/183; 358/185
[58] Field of Search ............... 358/906, 909, 160, 183, 358/209, 185, 22, 335; 340/734, 721

[56] References Cited

U.S. PATENT DOCUMENTS

| 4,608,603 | 8/1986 | Johnson | 358/183 |
| 4,613,906 | 9/1986 | Tanaka et al. | 358/183 |
| 4,675,737 | 6/1987 | Fujino et al. | 340/721 X |
| 5,016,112 | 5/1991 | Nakajima et al. | 358/185 X |

FOREIGN PATENT DOCUMENTS

| 326327 | 8/1989 | European Pat. Off. |
| 2586879 | 6/1987 | France |
| 1-264377 | 10/1989 | Japan |
| 2-284583 | 11/1990 | Japan |
| 2208959 | 4/1989 | United Kingdom |

OTHER PUBLICATIONS

"Title System for VTRS", National Convention Record of the Institute of Television Engineers (pp. 199-200) Japan, 1989.
Abstract of DE 3827970, German Published Application, May 1990.

Primary Examiner—James J. Groody
Assistant Examiner—Mark R. Powell
Attorney, Agent, or Firm—Antonelli, Terry, Stout & Kraus

[57] ABSTRACT

An apparatus for superimposing a video signal stored in a memory into a video signal which was photographed. A plurality of video signals to be superimposed are stored in the memory. Predetermined control codes are stored in the memory between the video signals or every $2^n$ addresses in the memory. By reading out the control codes, the head or end of each video signal is detected and the video signal is selected.

1 Claim, 5 Drawing Sheets

| KEY | 1 | 1 | 1 | 1 | 1 | 1 | 1 | 1 | 0 | 0 | 0 | 0 |
|---|---|---|---|---|---|---|---|---|---|---|---|---|
| R1 | 0 | 0 | 0 | 0 | 1 | 1 | 1 | 1 | 0 | 0 | 0 | 0 |
| G1 | 0 | 0 | 1 | 1 | 0 | 0 | 1 | 1 | 0 | 0 | 1 | 1 |
| B1 | 0 | 1 | 0 | 1 | 0 | 1 | 0 | 1 | 0 | 1 | 0 | 1 |
| | TITLES ARE SUPERIMPOSED | | | | | | | | NOT SUPERIMPOSED | | | |
| | BLACK | BLUE | GREEN | CYAN | RED | MAGENTA | YELLOW | WHITE | | LEFT UPPER EDGE (a) | RIGHT EDGE (b) | RIGHT LOWER EDGE (c) |

FIG. 6

| UPPER ADDRESSES \ LOWER ADDRESSES | 0 | 1 | 2 | 3 | 4 | 5 | 6 | ----- | 27 | 28 | 29 | 30 | 31 |
|---|---|---|---|---|---|---|---|---|---|---|---|---|---|
| 0 | ▨ | | | | | | | | | | | | |
| 1 | ▨ | | | | | | | | | | | | |
| 2 | ▨ | | | | | | | | | | | | |
| 3 | ▨ | | | | | | | | | | | | |
| 4 | ▨ | | | | | | | | | | | | |
| 5 | ▨ | | | | | | | | | | | | |

SUBTITLING APPARATUS WITH MEMORY CONTROL CODES INTERSPERSED WITH GRAPHIC DATA

BACKGROUND OF THE INVENTION

The present invention relates to a video signal processing apparatus for superimposing a title or the like into a video signal which was photographed by a video camera.

Apparatus for superimposing a title or the like into a video signal obtained by photographing an object by a video camera, for instance, is disclosed by "Title System For VTRs", 1989 National Convention Record of the Institute of Television Engineers of Japan, pages 199 to 200.

According to the above system, a title stored in a memory is superimposed into the video signal obtained by photographing an object by a camera.

According to the above conventional technique, since a memory capacity of one field is assigned to one title picture, efficiency in the use of the memory capacity is low and many titles cannot be stored.

SUMMARY OF THE INVENTION

It is an object of the invention to provide a video camera which is suitable to superimpose many titles by the efficient use of the capacity of the memory for the titles.

To accomplish the above object, according to the invention, a memory capacity corresponding to the size of each title picture is assigned to each title picture. Further, by adding a control code to the last data of each title, a plurality of titles having different data amounts can be superimposed into the video signal.

The data of the titles which were read out of the memory are sequentially superimposed into the video signals, and when the control code added to the end of each title data is detected, the superimposing process of the title is finished and the renewal of the read out address value of the memory is stopped. Due to this, in the case where the sizes of the title pictures on the display screen differ, the memory capacity corresponding to the size of each title picture can be assigned. Thus, the memory can be efficiently used and many title pictures can be stored.

BRIEF DESCRIPTION OF THE DRAWINGS

FIG. 6 is a memory map diagram of a memory in an embodiment of FIG. 5.

DESCRIPTION OF THE PREFERRED EMBODIMENTS

An embodiment of the present invention will be described hereinbelow with reference to FIGS. 1 to 4.

Figure 1:
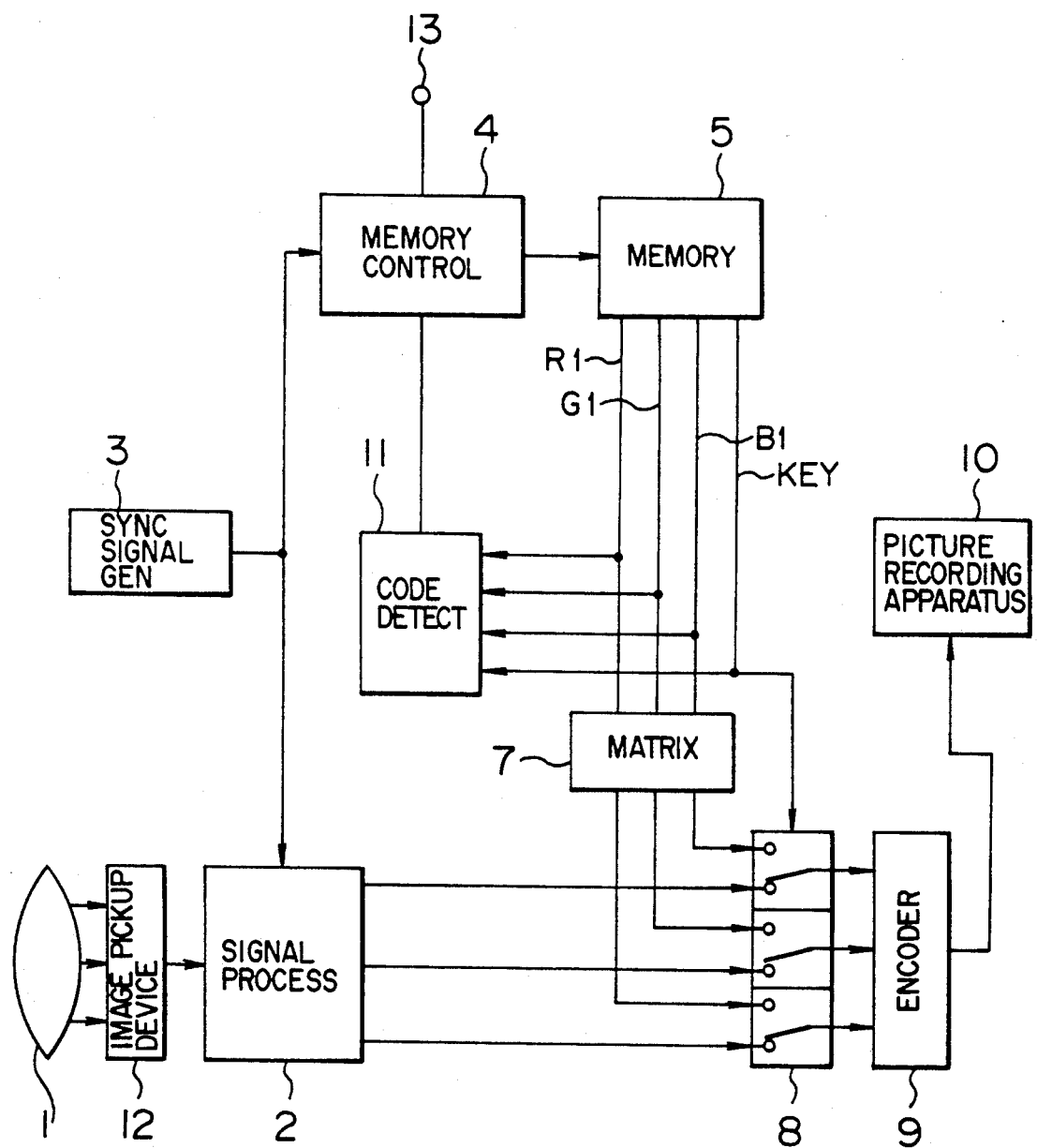
FIGS. 1 and 5 are circuit block diagrams of embodiments of the invention.

FIG. 1 is a circuit block diagram of the embodiment. Reference numeral 1 denotes a lens; 12 an image pickup device; 2 a signal processing circuit; 3 a sync signal generating circuit; 4 a memory control circuit; 5 a memory; 7 a matrix circuit; 8 a switching circuit; 9 an encoder; 10 a picture recording apparatus; and 11 a code detecting circuit.

In FIG. 1, data of a plurality of title pictures have previously been stored in the memory 5. The data of the title picture comprises: chrominance signals (signals $R_1$, $G_1$, and $B_1$ of three bits indicative of red, green, and blue) to designate the color of the title on a pixel unit basis; and a signal key of one bit indicative of the position of the title portion on the display screen. The signal Key is set to "1" in the title portion and "0" in the portions other than the title and changes in the edge portions of the title picture.

A video signal is extracted by the image pickup device 12 from a photo signal which passed through the lens 1 and is supplied to the signal processing circuit 2. The signal processing circuit 2 is driven by a sync signal which is generated from the sync signal generating circuit 3 and outputs a luminance signal Y and two color difference signals (R-Y) and (B-Y). Those signals are supplied to the encoder 9 through the switching circuit 8 and converted into the video signals which can be recorded. After that, a picture corresponding to the video signals is recorded by the picture recording apparatus 10. On the other hand, the sync signal from the sync signal generating circuit 3 is also supplied to the memory control circuit 4. An address signal is output to the memory 5 at a desired timing for superimposing the title synchronously with the photographed video signal. The title data $R_1$, $G_1$, $B_1$, and Key are read out of the memory 5 in accordance with the address signal. Among them, the chrominance signals $R_1$, $G_1$, and $B_1$ are led to the matrix circuit 7 and converted into the luminance signal Y and two color difference signals (R-Y) and (B-Y). After that, those signals are supplied to the switching circuit 8. The switching circuit 8 uses the signal Key which was read out of the memory 5 as a switching signal and is connected to the upper side in the diagram when the signal Key is set to "1" and to the lower side when the signal Key is set to "0". By the above operations, when the signal Key is set to "1", that is, in the title portion, the data of the title is output from the switching circuit 8. When the signal Key is set to "0", that is, in the portions other than the title portion, the photographed video signal is output from the switching circuit 8. The signal from the switching circuit 8 is supplied to the picture recording apparatus 10 through the encoder 9, so that the title can be inserted into the photographed picture and recorded.

Figures 2, 3:
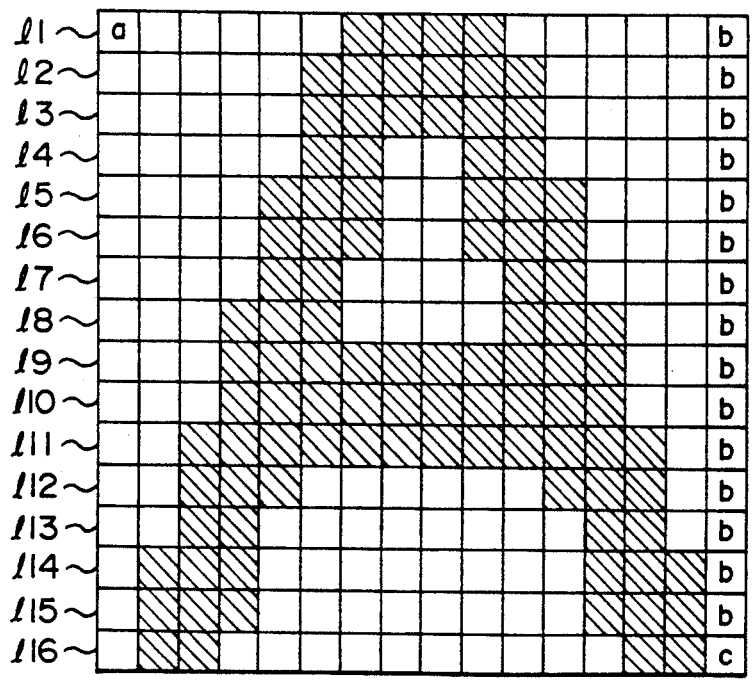
FIG. 2 is a diagram showing a combination of memory data in the embodiment of FIG. 1.
FIG. 3 is a diagram showing an example of a title picture which is displayed according to the embodiment of FIG. 1.

The control of the memory 5 will be further described in detail. The code detecting circuit 11 receives the memory data $R_1$, $G_1$, $B_1$, and Key which were read out of the memory 5 as input signals. When a predetermined code is detected, a command corresponding to the detected code is output to the memory control circuit 4. FIG. 2 shows combinations of the values of the memory data $R_1$, $G_1$, $B_1$, and Key of four bits, the colors of the titles each of which is superimposed in correspondence to such a combination, and the command which is output to the memory control circuit 4. When the signal Key is set to "1", the chrominance signals of eight colors are superimposed into the video signal in accordance with a combination of the signals $R_1$, $G_1$, and $B_1$. When the signal Key is set to "0", a control code is assigned. In this case, the signals $R_1$, $G_1$, and $B_1$ are indicative of the color of the title are set to the values irrespective of the color of the title. However, since the signal Key is at the "0" level, the control code does not exert any influence on the photographed video signal.

The control code is used to control addresses in the memory 5. It is assumed that control codes have been written in the addresses in the memory 5 corresponding to the pixels at a left upper edge a, a right edge b, and a right lower edge c of the title picture, respectively.

Figure 4:
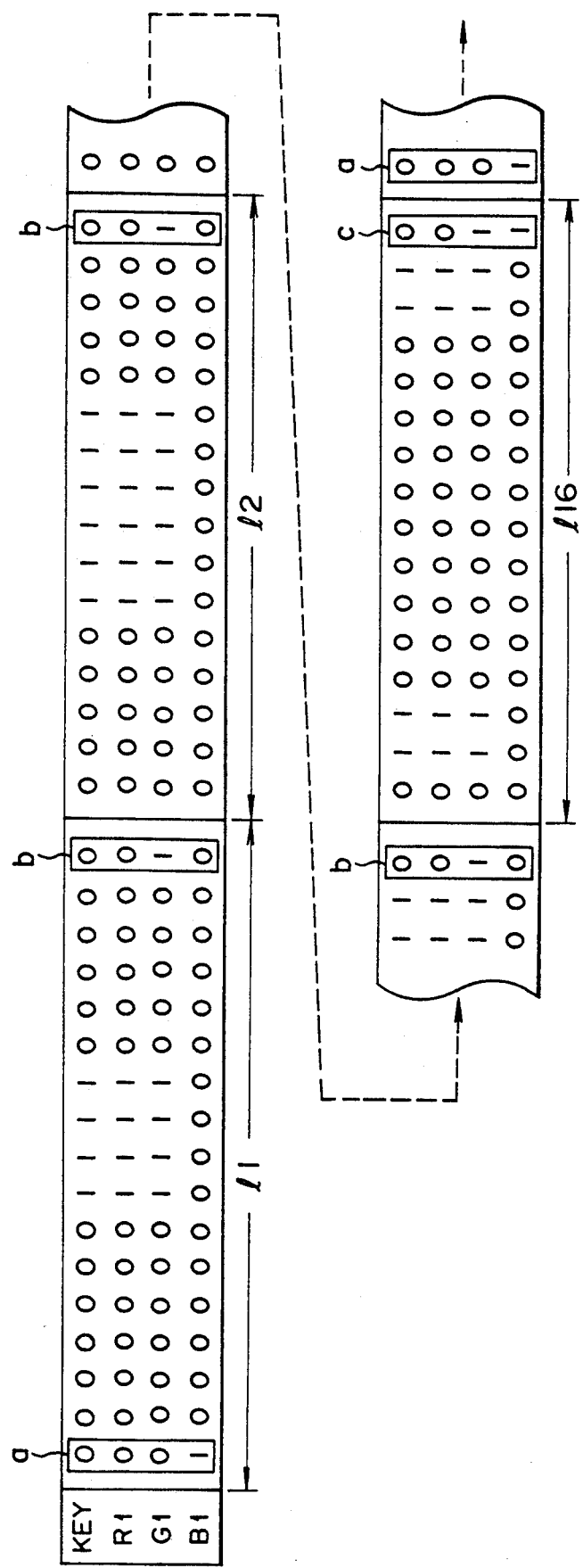
FIG. 4 is a memory map diagram in which the title picture of FIG. 3 was converted into the data.

FIG. 3 shows an example of the title picture. One frame expresses one pixel. A hatched portion denotes a title portion of yellow. A portion without a hatched region indicates a portion which is not the title. That is, a character "A" is superimposed in yellow into the video signal. Reference characters a, b, and c are written at the left upper edge, right edge, and right lower edge of the title, respectively. Reference numerals $\lambda_1$ to $\lambda_{16}$ indicate title data of scanning lines. FIG. 4 shows memory data of four bits of the title in FIG. 3. An axis of abscissa denotes an address direction. In the diagram, the data on the right side of the data $\lambda_{16}$ is another title data (not shown).

By the control of the memory control circuit 4, the memory address value begins to change at a timing corresponding to the left upper edge a of the inserting title synchronously with the sync signal from the sync signal generating circuit 3. Until the control code indicative of the right edge b of the title is detected by the code detecting circuit 11, the title data are sequentially read out and superimposed. When the control code indicative of the right edge b of the title is detected, the change of the memory address value is stopped by the control of the memory control circuit 4 and the address is held until the timing corresponding to the left edge of the title on the next scanning line. By repeating the operations similar to those mentioned above hereinafter, the title data of the scanning lines are sequentially read out and superimposed. When the control code indicative of the right lower edge c of the title is detected, the display of one title is finished. In the case where the above title is also continuously displayed even in the next field, after completion of the display of the title, the memory address is returned, for instance, for a vertical blanking period of time until the control code indicative of the left upper edge a as a display start point of the title data is detected.

The title to be displayed is selected by a control signal from a control signal input terminal 13. For example, for the vertical blanking period of time, the memory address is changed and the number of detecting times of the control code representative of the left upper edge a of the title is counted, so that the display title can be selected.

According to the embodiment, for a plurality of titles having different shapes and sizes, the memory capacity which is necessary for each title can be assigned to each title. Therefore, the memory capacities can be efficiently used and a number of titles can be stored into the memory having a predetermined capacity.

Another embodiment of the invention will now be described with reference to FIGS. 5 and 6.

Figure 5:
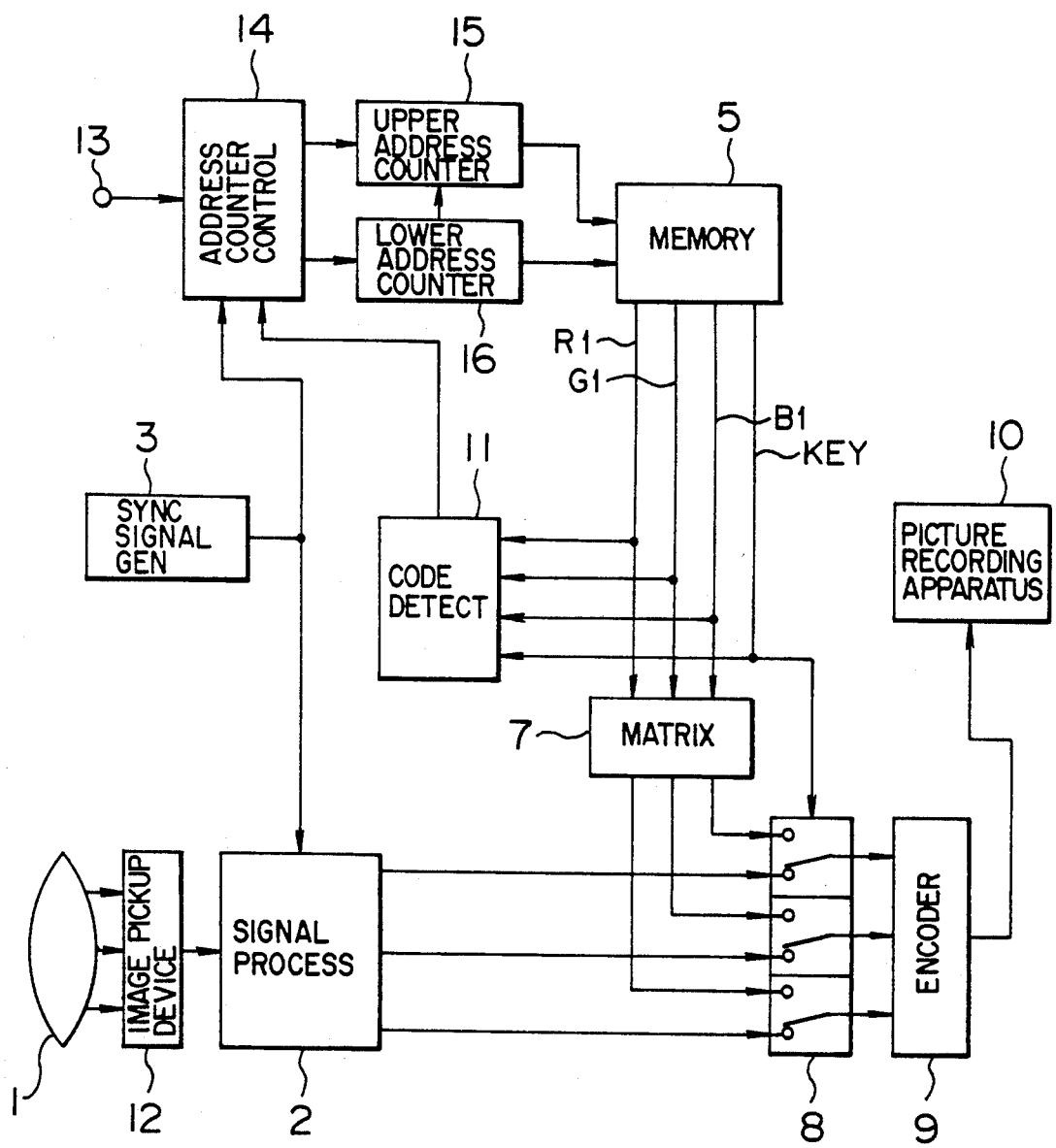

In FIG. 5, reference numeral 14 denotes an address counter control circuit; 15 indicates a counter for generating upper addresses; and 16 counter for generating lower addresses. In FIG. 5, the same parts and components as those shown in the embodiment of FIG. 1 are designated by the same reference numerals.

FIG. 6 shows an example of memory data. An axis of abscissa indicates five bits of the lower addresses. An axis of ordinate represents upper addresses which are higher than the lower addresses. A hatched portion indicates a memory address in which the control code has been written. A portion other than the hatched region represents an address in which data of the title has been written.

In the embodiment, it is assumed that the control codes have been written in the memory spaces in the memory 5 at a period of the $2^n$ addresses (n is a positive integer). In the embodiment, explanation will be made on the assumption that n=5, that is, the control codes have been inserted at a period of 32 addresses. However, the invention is not limited to such an example. An identification code to identify each title, a code indicative of the head or end data of each title, and the like are added as control codes.

In FIG. 5, the counter 16 is an address counter to generate addresses of lower five bits. The counter 15 is an address counter to generate addresses of the sixth bit and subsequent bits. It is assumed that one title data has a data amount of 32=m addresses (m is a positive integer) in which the data of 32 addresses is set as the minimum unit. For a period of time when the title is being displayed, the two counters 15 and 16 operate as a single coupled counter and sequentially read out the data from the memory 5.

The parts and components designated by the same reference numerals as those shown in the embodiment of FIG. 1 execute the similar operations even in the embodiment and their descriptions are omitted. After completion of the display of the title, in the case of continuously displaying the same title even in the next field, it is necessary to return the memory address to the start address of the title until a timing to start the title display in the next field. At this time, for instance, the two address counters 15 and 16 are controlled by the control of the control circuit 14 of the address counters for the vertical blanking period. Thus, the values of the five bits of lower addresses are fixed to "0" and the values of the upper addresses decrease. Therefore, only the data in the addresses in which the control codes were written are continuously read out from the memory 5. The readout control code is supplied to the code detecting circuit 11 and until the head address of the title is detected, the count value of the counter 15 changes.

On the other hand, even in the case of selecting another title, in a manner similar to the above, for instance, for the vertical blanking period of time, the values of five bits of the lower addresses are fixed to "0", the values of the upper addresses are increased or decreased, the control codes are read out, and the values of the upper addresses change until the head address of a desired title is detected.

According to the embodiment, since the control codes have been superimposed at a period of $2^n$ addresses, the circuit scale to search the title can be reduced. The invention is suitable for an apparatus to superimpose a plurality of titles.

According to the invention, since a plurality of titles having different shapes and sizes can be efficiently stored into the memory of a predetermined capacity, a video camera suitable to superimpose a number of titles can be realized.

The present invention can be also embodied by any forms other than the foregoing embodiments without departing from the spirit and essential features of the invention. Therefore, the above embodiments have merely been described with respect to examples of the invention with respect to all of the points and should not be limitedly interpreted. The scope of the invention is shown in the scope of claims for a patent. Further, all of the variations and modifications which belong to the equivalent range of the scope of claims for a patent are within the scope of the invention.

We claim:

1. An apparatus for selecting a video signal from a plurality of video signals previously stored in a memory and for superimposing the selected video signal on another video signal, comprising:
   (a) said memory having stored therein at least two video signals to be superimposed on said another video signal, each video signal to be superimposed including predetermined control codes which have been stored every $2^n$ addresses (n is a positive integer) in said memory;
   (b) a code detecting circuit for detecting a type of said predetermined control codes which indicate a head address of a video signal to be superimposed read out from said memory;
   (c) a first memory address generating circuit for generating lower n bits of an address signal to be applied to said memory;
   (d) second memory address generating circuit for generating upper bits, other than the lower n bits, of said address signal to be applied to said memory; and
   (e) a memory address control circuit for controlling the first and second memory address generating circuits such that video signals stored in the memory are sequentially read out from said memory in response to said address signal, and when a video signal to be superimposed on said another video signal is selected, said first memory address generating circuit is controlled so that values of the lower n bits of said address signal are fixed to an address at which said predetermined control codes are stored, and said second memory address generating circuit is controlled so that said upper bits of said address signal are increased or decreased, thereby reading out only said predetermined control codes from said memory and repeatedly increasing or decreasing the upper bits of said address signal until said selected video signal to be superimposed on said another video signal is detected based on a result of said detection by said code detecting circuit.

* * * * *